United States Patent
Fu et al.

(10) Patent No.: US 12,244,521 B2
(45) Date of Patent: Mar. 4, 2025

(54) METHOD AND APPARATUS FOR DETERMINING RESOURCE LOCATION, AND DEVICE AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Cong Shi, Dongguan (CN)

(73) Assignee: GUANGDONG OPPO TELECOMMUNICATIONS CORP., LTD., Dongguan (CN)

( * ) Notice: Subject to any disclaimer, the term of this patent is extended or adjusted under 35 U.S.C. 154(b) by 381 days.

(21) Appl. No.: 17/722,952

(22) Filed: Apr. 18, 2022

(65) Prior Publication Data

US 2022/0239422 A1    Jul. 28, 2022

Related U.S. Application Data

(63) Continuation of application No. PCT/CN2020/090260, filed on May 14, 2020.

(51) Int. Cl.
*H04W 56/00*    (2009.01)
*H04L 5/00*    (2006.01)
*H04W 36/00*    (2009.01)

(52) U.S. Cl.
CPC .......... *H04L 5/0005* (2013.01); *H04L 5/0048* (2013.01); *H04W 36/0072* (2013.01)

(58) Field of Classification Search
CPC . H04L 5/0005; H04L 5/0048; H04W 36/0072
USPC ........................................................ 370/330
See application file for complete search history.

(56) References Cited

U.S. PATENT DOCUMENTS

| | | | |
|---|---|---|---|
| 2019/0132862 A1 | 5/2019 | Jeon et al. | |
| 2019/0190681 A1 | 6/2019 | Li et al. | |
| 2019/0349983 A1 | 11/2019 | Loehr et al. | |
| 2020/0112976 A1 | 4/2020 | Lin | |
| 2020/0120584 A1* | 4/2020 | Yi | H04L 5/0048 |
| 2021/0392685 A1* | 12/2021 | Myung | H04W 72/1263 |

(Continued)

FOREIGN PATENT DOCUMENTS

| | | |
|---|---|---|
| CN | 110474735 A | 11/2019 |
| CN | 110831048 A | 2/2020 |

(Continued)

OTHER PUBLICATIONS

International Search Report issued in corresponding International Application No. PCT/CN2020/090260, mailed Feb. 5, 2021, 27 pages.

(Continued)

*Primary Examiner* — Sai Ming Chan
(74) *Attorney, Agent, or Firm* — BAYES PLLC

(57) ABSTRACT

Disclosed are a method and apparatus for determining a resource location, and a device and a storage medium, which belong to the technical field of communications. The method comprises: where a BWP is reactivated, determining the location of a CG resource according to first information, wherein the first information comprises frame number information used for determining the location of the CG resource. Provided is a method for determining or calculating the location of a CG resource corresponding to a BWP after the BWP is reactivated.

11 Claims, 4 Drawing Sheets

(56) References Cited

U.S. PATENT DOCUMENTS

| | | | |
|---|---|---|---|
| 2022/0264680 A1* | 8/2022 | Kim | H04W 76/15 |
| 2022/0295531 A1* | 9/2022 | Lee | H04W 72/23 |

FOREIGN PATENT DOCUMENTS

| | | | |
|---|---|---|---|
| CN | 110972172 A | 4/2020 | |
| CN | 111092705 A | 5/2020 | |
| CN | 111148262 A | 5/2020 | |
| WO | 2019139995 A1 | 7/2019 | |
| WO | 2020067978 A1 | 4/2020 | |

OTHER PUBLICATIONS

Written Opinion of the International Searching Authority issued in corresponding International Application No. PCT/CN2020/090260, mailed Feb. 5, 2021, 8 pages.

"3rd Generation Partnership Project; Technical Specification Group Radio Access Network; NR; Medium Access Control (MAC) protocol specification (Release 16)", 3GPP TS 38.321 V16.5.0 (Jun. 2021), 156 pages.

"The Remaining issues on configured grant type 1 resource calculation", Agenda item: 6.7.2.2, Agenda item: 6.7.2.2, 3GPP TSG-RAN WG2 #109 E-meeting Bis, R2-2003586, 5 pages.

"3rd Generation Partnership Project; Technical Specification Group Radio Access Network; NR; Physical layer procedures for data (Release 16)", 3GPP TS 38.214 V16.1.0 (Mar. 2020), 151 pages.

Second Office Action issued in corresponding Chinese application No. 202210508950.X, mailed Aug. 31, 2023.

Decision of Rejection issued in corresponding Chinese application No. 202210508950.X, mailed Nov. 22, 2023.

Extended European Search Report issued in corresponding European application No. 20935811.8, mailed Nov. 21, 2022.

CMCC, "Summary of offline discussion-026- Scheduling Enhancements", R2-2004158, 3GPP TSG-RAN WG2 #109bis-e E-meeting: Apr. 20-30, 2020.

OPPO, "Discussion on remaining issues for Type-1 CG", R2-2005339, 3GPP TSG-RAN WG2 Meeting #110 Online, Jun. 1-Jun. 12, 2020.

First Office Action issued in corresponding Chinese application No. 202210508950.X, mailed Jun. 16, 2023.

First Office Action issued in corresponding European application No. 20935811.8, mailed Jul. 13, 2023.

Ericsson, "SPS and CG remaining MAC aspects", Tdoc R2-2000789, 3GPP TSG-RAN WG2 #109e Electronic meeting, Feb. 24-Mar. 6, 2020.

Huawei et al., "Correction to MAC spec for eURLLC", R2-2004148, 3GPP TSG-RAN WG2 Meeting #109bis-e Electronic, Apr. 20-Apr. 30, 2020.

OPPO, "SFN misalignment issue on periodicities of non-divisor of 10240ms", R2-2000697, 3GPP TSG-RAN WG2 Meeting #109 electronic Feb. 24-Mar. 6, 2020.

\* cited by examiner

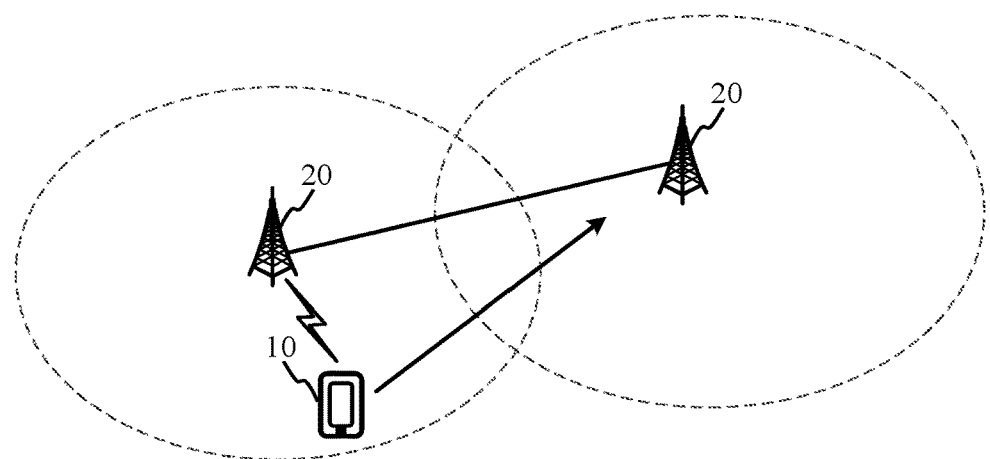
Fig. 1
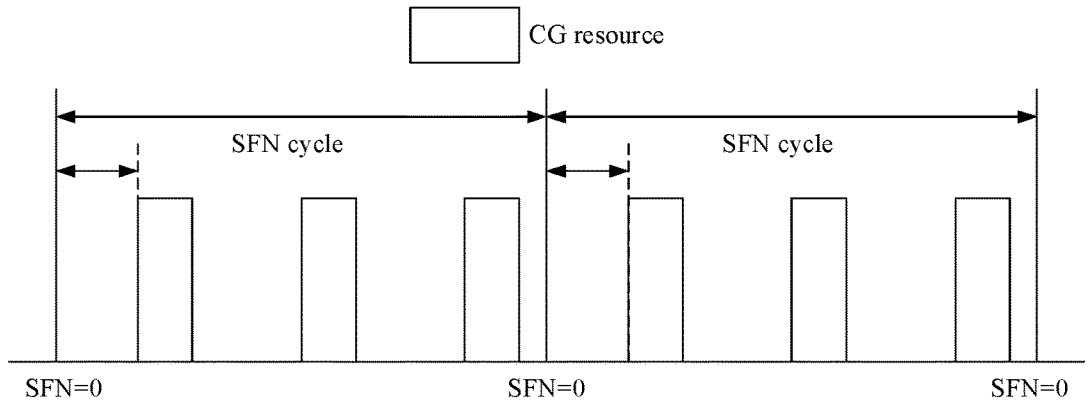
Fig. 2
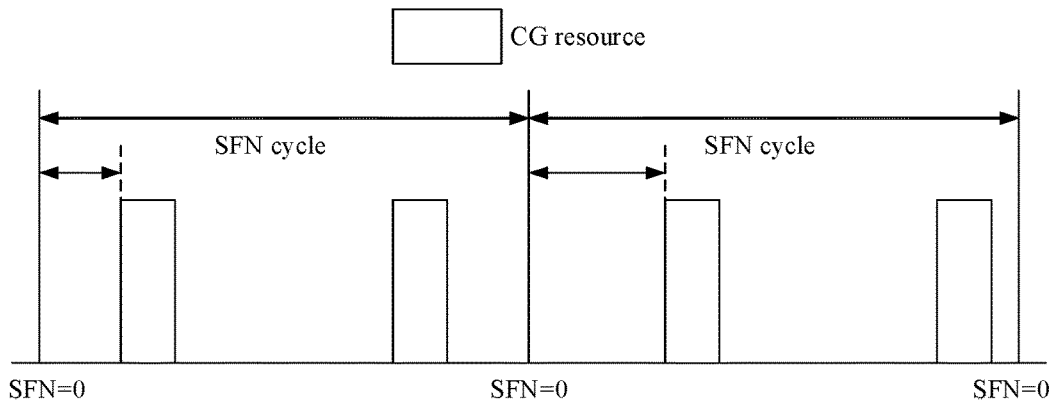
Fig. 3
WHERE A BWP IS REACTIVATED, DETERMINE THE LOCATION OF A CG RESOURCE ACCORDING TO FIRST INFORMATION, WHEREIN THE FIRST INFORMATION COMPRISES FRAME NUMBER INFORMATION USED FOR DETERMINING THE LOCATION OF THE CG RESOURCE — 410
Fig. 4

METHOD AND APPARATUS FOR DETERMINING RESOURCE LOCATION, AND DEVICE AND STORAGE MEDIUM

CROSS-REFERENCE TO RELATED APPLICATION

This application is a continuation of International Application No. PCT/CN2020/090260, filed May 14, 2020, the contents of which is incorporated herein by reference in its entirety.

TECHNICAL FIELD

The embodiments of the present application relate to the field of communications technologies, and in particular, to a method, apparatus, device, and storage medium for determining a resource location.

BACKGROUND

The fifth generation mobile communication (5th-Generation, 5G) Industrial Interest of Things (IIoT) needs to support transmission of factory automation, transport industry, electrical power distribution and other services in 5G system.

Based on its transmission requirements of delay and reliability, IIoT introduces the concept of Time Sensitive Network (TSN) or Time Sensitive Transmission (TSC). According to the service characteristics of the TSC, the TSC service is usually a highly reliable and low-latency service, and in most scenarios, the TSC service appears periodically. In order to support the TSC service, the network device configures Configured Grant (CG) resources for the terminal device. The CG resources are divided into two types: type1 and type2. Type1 CG resource is a CG resource that is activated by Radio Resource Control (RRC) configuration, and Type2 CG resource is a CG resource that can be activated by Downlink Control Information (DCI) indication after RRC configuration.

In addition, in order to provide a relatively large data transmission rate and improve user experience, the 5G system introduces the concept of Bandwidth Part (BWP). When BWP is deactivated, Type1 CG resources are suspended, and the buffer of the corresponding Hybrid Automatic Repeat reQuest (HARQ) is not emptied, that is, Media Access Control (MAC) Protocol Data Unit (PDU) is still inside; and when BWP is reactivated, Type1 CG resources continue to be used.

However, since the periodicity of the CG resource cannot be divisible by 1024*SFN (System Frame Number) (or 10240 milliseconds), for each SFN cycle, the calculated start offset of the CG resource is different. In this case, how to calculate the CG resource location corresponding to the reactivated BWP needs further discussion and research.

SUMMARY

Embodiments of the present application provide a method, apparatus, device, and storage medium for determining a resource location. The technical solutions are as follows.

In an aspect, an embodiment of the present application provides a method for determining a resource location, which is applied to a terminal device, and the method includes:

in a case that BWP is reactivated, determining a location of a CG resource according to first information, where the first information includes frame number information for determining the location of the CG resource.

In another aspect, an embodiment of the present application provides an apparatus for determining a resource location, which is provided in a terminal device, and the apparatus includes:

a location determination module, configured to determine a location of a CG resource according to first information in a case that BWP is reactivated, where the first information includes frame number information for determining the location of the CG resource.

In still another aspect, an embodiment of the present application provides a terminal device, and the terminal device includes: a processor, and a transceiver connected to the processor; where:

the processor is configured to, in a case that BWP is reactivated, determine a location of a CG resource according to first information, where the first information includes frame number information for determining the location of the CG resource.

In still another aspect, an embodiment of the present application provides a computer-readable storage medium, where a computer program is stored in the storage medium, and the computer program is used to be executed by a processor of a terminal device, so as to realize the method for determining a resource location as described above.

In still another aspect, an embodiment of the present application provides a chip, the chip includes a programmable logic circuit and/or program instructions, and when the chip runs on a terminal device, the above method for determining a resource location is implemented.

The technical solutions provided by the embodiments of the present application may include the following beneficial effects.

In the case that BWP is reactivated, the location of the CG resource is determined according to the first information, where the first information includes frame number information for determining the location of the CG resource, thereby providing a method for determining or calculating the location of the CG resource corresponding to the BWP after the BWP is reactivated.

In addition, in the embodiments of the present application, the frame number information is used by the terminal device to provide a definite system frame number cycle and/or hyper frame number when determining or calculating the location of the CG resource, so that the terminal device can clearly refer to the frame number information, to ensure that the location of the CG resource determined or calculated by the terminal device and the location of the CG resource determined or calculated by the network device using the same method for determining a resource location are the same, thereby ensuring the quality of service such as TSC services and improving the reliability of communication

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

FIG. 1 is a schematic diagram of a network architecture provided by an embodiment of the present application;

FIG. 2 is a schematic diagram of a location of a CG resource provided by an embodiment of the present application;

FIG. 3 is a schematic diagram of the location of a CG resource provided by another embodiment of the present application;

FIG. 4 is a flowchart of a method for determining a resource location provided by an embodiment of the present application;

DETAILED DESCRIPTION

Figure 5:
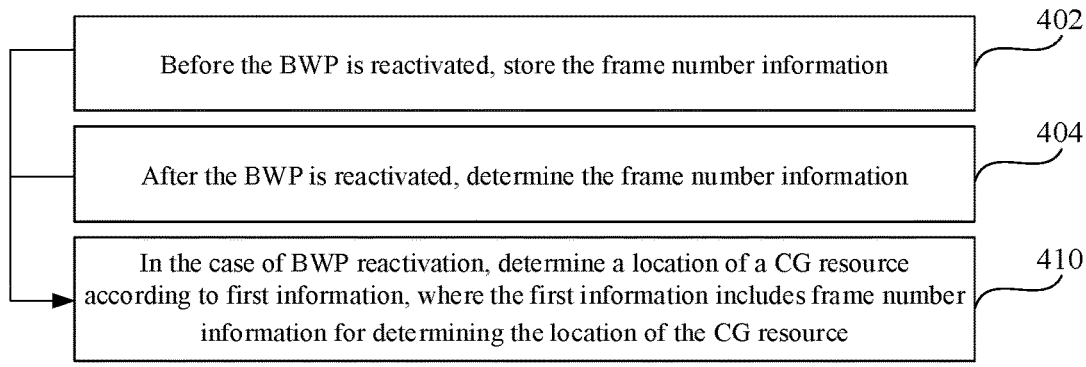
FIG. 5 is a flowchart of a method for determining a resource location provided by another embodiment of the present application.

In order to make the objectives, technical solutions and advantages of the present application more clear, the embodiments of the present application will be further described in detail below with reference to the accompanying drawings.

The network architecture and service scenarios described in the embodiments of the present application are for the purpose of illustrating the technical solutions of the embodiments of the present application more clearly, and do not constitute a limitation on the technical solutions provided by the embodiments of the present application.

The person skilled in the art could know that with the evolution of network architecture and the emergence of new service scenarios, the technical solutions provided in the embodiments of the application are also applicable to similar technical problems.

Referring to FIG. 1, which shows a schematic diagram of a network architecture provided by an embodiment of the present application, the network architecture may include: a terminal device 10 and a network device 20.

The number of the terminal device 10 is usually multiple, and one or more terminal devices 10 may be distributed in a cell managed by each network device 20. The terminal device 10 may include various handheld devices, in-vehicle devices, wearable devices, computing devices or other processing devices connected to wireless modems with wireless communication functions, as well as various forms of user equipment (UE), mobile stations (MSs) and so on. For convenience of description, in the embodiments of the present application, the devices mentioned above are collectively referred to as the terminal device.

The network device 20 is an apparatus deployed in an access network to provide a wireless communication function for the terminal device 10. The network device 20 may include various forms of macro base stations, micro base stations, relay stations, access points, and the like. In systems using different radio access technologies, the names of devices with network device functions may vary.

For example, in a 5G New Radio (NR) system, they are called gNodeBs or gNBs. As communications technology evolves, the name "network device" may change. For convenience of description, in the embodiments of the present application, the above-mentioned apparatuses for providing a wireless communication function for the terminal device 10 are collectively referred to as the network device.

The "5G NR system" in the embodiments of the present disclosure may also be referred to as a 5G system or an NR system, but those skilled in the art can understand its meaning. The technical solutions described in the embodiments of the present disclosure may be applicable to the 5G NR system, and may also be applicable to the subsequent evolution systems of the 5G NR system.

In order to provide a relatively high data transmission rate and improve user experience, 5G NR further increases the system bandwidth on the basis of fourth-generation mobile communication (4th-Generation, 4G). In 5G NR, for frequency bands below 6 GHz (gigahertz), the maximum bandwidth supported by a single carrier is 100 MHz (megahertz); and for frequency bands above 6 GHz, the maximum bandwidth supported by a single carrier is 400 MHz.

Like the 4G system, 5G NR also supports Carrier Aggregation (CA) technology. The network device configures a plurality of serving cells for the terminal device, and then the terminal device can simultaneously send and receive data on the plurality of serving cells, thereby increasing the data transmission rate.

However, for a large carrier bandwidth (such as 100 HMz), the bandwidth that the terminal device needs to use is often very limited. If the terminal device is always allowed to detect and measure the entire bandwidth, it will bring great challenges to the power consumption of the terminal device, which is not conducive to the power saving of the terminal device. Therefore, the concept of BWP is introduced in 5G NR, that is, a part of continuous bandwidth is divided from the entire large-bandwidth carrier for the terminal device to send and receive data. The terminal device only needs to perform related operations within this part of the bandwidth of the network configuration, thereby achieving the effect of energy saving of the terminal device.

Based on the 5G NR Rel15 (Release 15, $15^{th}$ version) standard, for each serving cell of the terminal device, the network device may configure one or more BWPs for the terminal device on the serving cell through the Radio Resource Control (RRC) configuration information.

For example, the maximum number of BWPs that can be configured by the network device is 4.

For example, at a certain moment, the terminal device can only have one activated Downlink (DL) BWP and one activated Uplink (UL) BWP on a certain serving cell, and the terminal device can only send and receive data on the activated BWP.

For example, the terminal device may use the following four ways to implement BWP handover: BWP handover based on Physical Downlink Control Channel (PDCCH), BWP handover based on RRC configuration or reconfiguration, BWP handover based on timer timeout, BWP handover caused by random access procedure initialization.

In addition, 5G IIoT needs to support the transmission of industrial automation, transmission automation, smart power and other services in the 5G system. Based on its transmission requirements for latency and reliability, IIoT introduces concepts such as time-sensitive networks. According to the service characteristics of the TSC network, the TSC service is usually a highly reliable and low-latency service, and in most scenarios, the TSC service appears periodically. In order to support the TSC service, the network device configures CG resources for the terminal device.

The CG resources are divided into Type1 and Type2. Type 1 CG resources are CG resources that are activated after configuration, and Type 2 CG resources are CG resources that can be activated only after being indicated to be activated by a DCI indication.

In the embodiments of the present application, only Type1 CG resources are used as an example for illustration. Those skilled in the art will easily think of technical solutions related to Type2 CG resources after understanding the technical solutions of the present application, but all belong to the protection scope of the present application. The following describes the Type1 CG resource.

Starting from R15, the location of the Type1 CG resource is notified in RRC information.

For example, the location information about the CG resource that will be notified in the RRC information includes: periodicity, frequency domain location, time domain offset, and so on. The time domain offset is given by two parameters: time domain offset (timeDomainOffset) and time domain allocation (timeDomainAllocation), where timeDomainOffset is an offset of the CG resource relative to SFN=0 in the time domain, and is a slot level offset; and timeDomainAllocation is an allocation in which an uplink grant is configured in the time domain and that includes a start symbol and a length, and is a symbol level offset in the slot.

The calculation process of the location of the Type1 CG resource is given below.

According to the Type1 CG resource configured by the upper-layer service unit, the MAC entity shall: store the uplink grant provided by the upper-layer service unit as the configured uplink grant of the designated service unit; initialize or re-initialize the configured uplink grant, start in the symbol according to the time domain offset and S (start symbol), and re-occur periodically. After one uplink grant is configured as a Type1 grant type, the MAC entity shall consider the uplink grant recursion associated with each symbol:

[($SFN$×numberOfSlotsPerFrame×numberOfSymbolsPerSlot)+(slot number in the frame×numberOfSymbolsPerSlot)+symbol number in the slot]=

(timeDomainOffset×numberOfSymbolsPerSlot+$S$+$N$×periodicity) modulo (1024×numberOfSlotsPerFrame×numberOfSymbolsPerSlot), for all $N ≥ 0$.

Wherein, numberOfSlotsPerFrame is the number of slots in each radio frame, numberOfSymbolsPerSlot is the number of symbols in each slot, slot number in the frame is a label of slot in the radio frame, symbol number in the slot is a label of symbol in the slot, and modulo is a modulo operation. When the Sub-Carrier Spacing (SCS) is 30 KHz (kilohertz) and is a conventional Cyclic Prefix (CP), the value of numberOfSlotsPerFrame is 20, and the value of numberOfSymbolsPerSlot is 14.

Each SFN cycle has 1024 radio frames, for example, which are numbered from 0 to 1023. One SFN wrap around is performed every 1024 radio frames, that is, the frame number of SFN starts from 0 again. It can be seen from the above formula that when the periodicity of the CG resource is divisible by (1024× numberOfSlotsPerFrame× numberOfSymbolsPerSlot), that is, it is divisible by 1024*SFN (or 10240 milliseconds), for each SFN cycle, the calculated start offsets of the CG resource are the same. As shown in FIG. 2, for each SFN cycle, the time domain positions of the initial CG resources are the same (the offsets of the SFN of the initial CG resources relative to SFN=0 in each SFN cycle are the same).

However, starting from R16 (Release 16, 16$^{th}$ version), the periodicity of the CG resources may not be a divisor of 10240 milliseconds (i.e., 1024*SFN), or it may not be divisible by 10240 milliseconds. In the case that the periodicity of the CG resource is not divisible by (1024× numberOfSlotsPerFrame× numberOfSymbolsPerSlot), that is, it cannot be divisible by 1024*SFN (or 10240 milliseconds), for each SFN cycle, the calculated start offset of the CG resource is not the same. As shown in FIG. 3, for each SFN cycle, the time domain position of the initial CG resource is different (the offset of the SFN of the initial CG resource relative to SFN=0 in each SFN cycle is different).

In an example, if the network device sends CG resource configuration information at a boundary of the SFN cycle (SFN wrap around), it may cause the network device to send the CG resource configuration information in the previous SFN cycle, and the network device calculates the location of the CG resource by using the location of SFN=0 in the previous SFN cycle as the reference; the terminal device receives the CG resource configuration information in the next SFN cycle, and the terminal device uses the location of SFN=0 in the next SFN cycle as the reference to calculate the location of the CG resource. When the periodicity of the CG resource cannot be divisible by 1024*SFN (or 10240 milliseconds), for each SFN cycle, the time domain location of the initial CG resource is not the same, therefore the network device sends the CG resource configuration information at the boundary of the SFN cycle (SFN warp around), which may cause that the locations of the CG resources calculated by the network device and the terminal device are different. To solve this problem, R16 introduces timeReferenceSFN (reference SFN) in the CG resource configuration information, and timeReferenceSFN is used to instruct the terminal device to use the closest reference SFN before receiving the configured grant configuration. Correspondingly, after one uplink grant is configured as a Type1 grant type, the MAC entity shall consider n uplink grant recursions associated with each symbol in order:

[($SFN$×numberOfSlotsPerFrame×numberOfSymbolsPerSlot)+(slot number in the frame×numberOfSymbolsPerSlot)+symbol number in the slot]=

(timeReferenceSFN×numberOfSlotsPerFrame×numberOfSymbolsPerSlot+timeDomainOffset×numberOfSymbolsPerSlot+$S$+$N$×periodicity) modulo (1024×numberOfSlotsPerFrame×numberOfSymbolsPerSlot).

For explanations about parameters in the above formula, the above embodiment may be referred to, and details are not repeated here.

It can be known from the descriptions of the above embodiments that the terminal device can only use a certain BWP at a certain moment, and the terminal device can switch to use different BWPs. When a certain BWP is deactivated, the Type1 CG resource on this BWP is suspended, and the corresponding HARQ buffer is not emptied, that is, the Media Access Control (MAC) Protocol Data Unit (PDU) is still inside; in the case that the BWP is reactivated, the suspended Type1 CG resource can continue to be used.

However, in the case where the deactivated BWP is reactivated, before using the Type1 CG resource on this BWP, the terminal device needs to recalculate to determine the location of the Type1 CG resource. At this time, the terminal device needs to determine that the reference SFN in which SFN cycle, or Hyper Frame Number (HFN) in which hyper frame, or the like, is used for calculating the location of the Type1 CG resource. If such information is not determined, the SFN cycles, the hyper frames or the like determined by the terminal device and the network device may be inconsistent. If the periodicity of CG resources cannot be divisible by 1024*SFN (or 10240 milliseconds), the locations of the CG resources determined by the terminal device and the network device will be different, resulting in that when the TSC service arrives, there is no available UL resource to transmit the TSC service, and thus the Quality-of-Service (QoS) of the TSC service cannot be guaranteed.

Based on this, the embodiment of the present application provides a method for determining a resource location, which can be used by the terminal device to determine the location of the CG resource on the BWP after the BWP is reactivated, so as to ensure that the locations of the CG resource determined by the terminal device and the network device are the same, thereby ensuring the quality-of-service of the TSC service, etc.

It should be noted that, in the embodiments of the present application, the CG resource, the configured uplink grant resource, the configured grant resource, etc. express the same meaning, and where these terms appear, they can be replaced by other names in these terms. For the convenience of description, in the method embodiments of the present application, these terms are collectively referred to as the CG resource, and those skilled in the art should understand its meanings.

Hereinafter, the technical solutions of the present application will be introduced and described through several exemplary embodiments.

Referring to FIG. 4, which shows a flowchart of a method for determining a resource location provided by an embodiment of the present application. The method may be applied to the network architecture shown in FIG. 1, for example, applied to a terminal device, and the method may include the following steps.

In step 410, in the case that BWP is reactivated, a location of a CG resource is determined according to first information, where the first information includes frame number information for determining the location of the CG resource.

The network device may configure one or more BWPs for the terminal device, the terminal device can only use one BWP at a certain moment, and the terminal device can switch to use different BWPs. Assuming that the terminal device needs to switch to another BWP after activating a certain BWP, the BWP can be deactivated, and this BWP can also be reactivated when it needs to be switched to this BWP.

In the embodiment of the present application, the network device may configure the CG resource corresponding to a certain BWP for the terminal device through RRC information.

For example, the network device sends CG resource configuration information to the terminal device, where the CG resource configuration information is used to configure the CG resource corresponding to the BWP, and the CG resource configuration information is the RRC information. The embodiment of the present application does not limit the specific content of the CG resource configuration information.

Optionally, the CG resource configuration information includes at least one of the following: a resource periodicity, a reference frame number, a time domain offset, and a start symbol. The resource periodicity may be periodicity described above, the reference frame number may be timeReferenceSFN described above, the time domain offset may be timeDomainOffset described above, and the start symbol (Start Symbol) may be S described above.

The start symbol may be directly given by the CG configuration information, or may be calculated by the terminal device through the time domain offset in the CG configuration information, which is not limited in the embodiments of the present application. For the introduction and description of these parameters, the above-mentioned embodiment may be referred to, and details are not repeated here.

After receiving the CG resource configuration information, the terminal device may determine the location of the CG resource corresponding to the BWP according to the parameters in the CG resource configuration information and the calculation formula of the CG resource. Optionally, the calculation formula of the CG resource is the same as the calculation formula in the above-mentioned embodiment. For the introduction and description, the above-mentioned embodiment may be referred to. In this embodiment of the present application, the location of the CG resource calculated by the terminal device includes a starting location of the CG resource and the location of each subsequent available CG resource. The terminal device may calculate all the locations at one time, or separately calculate all the locations at each moment. The locations of the CG resources calculated by the terminal device are distributed in at least one system frame number cycle (SFN cycle). For the introduction and description of the system frame number cycle, the above embodiment may be referred to, and details are not repeated here. Optionally, the terminal device calculates the location of the CG resource when a certain system frame number cycle arrives or at each time position; or, the terminal device calculates the location of the CG resource in all system frame number cycles at one time, which is not limited in the embodiments of the present application. In practical applications, the specific calculation method may be determined in combination with the processing overhead of the terminal device and the requirement for the accuracy of the calculation result.

In the embodiment of the present application, the activated BWP may also be deactivated at a certain moment. When the BWP is deactivated, the CG resource corresponding to the BWP is also stopped, that is, the terminal device no longer uses the CG resource corresponding to this BWP or no longer calculates the location of the CG resource corresponding to this BWP. Optionally, in the case that the terminal device calculates the location of the CG resource when a certain system frame number cyclically arrives or at each time position, when the BWP is deactivated, the terminal device continues to calculate the location of the CG resource corresponding to the BWP according to the CG resource configuration information.

At a certain moment after the BWP is deactivated, the BWP may also be reactivated to re-enable the BWP and the CG resource corresponding to the BWP. The embodiment of the present application does not limit the subject that triggers the reactivation of the BWP. Optionally, the reactivation of the BWP is triggered by the terminal device, for example, the terminal device reactivates the BWP when it needs to switch to this BWP; or, the reactivation of the BWP is triggered by the network device, for example, the network device sends RRC information or DCI information to the terminal device to instruct the terminal device to re-enable the BWP; or, the reactivation of the BWP is triggered by a timer, for example, when a deactivation timer corresponding to the BWP expires, the reactivation of the BWP is triggered. When the deactivated BWP is reactivated, the terminal device may restart the CG resource on the BWP, that is, reuse the CG resource on the BWP or calculate the location of the CG resource on the BWP. Optionally, in the case that the terminal device calculates the location of the CG resource when a certain system frame number cyclically arrives or at each time position, when the BWP is reactivated, the terminal device continues to calculate the location of the CG resource corresponding to the BWP according to the CG resource configuration information.

For the case where the terminal device stops determining or calculating the location of the CG resource corresponding to the BWP when the BWP is deactivated, and when the BWP is reactivated at a certain moment after the deactivation of the BWP, in order for the terminal device to determine the system frame number cycle or hyper frame number used for calculating the location of the CG resource to ensure that the locations of the CG resource calculated by the terminal device and the network device align, the terminal device determines the location of the CG resource corresponding to the BWP according to first information, and the first information includes frame number information used to determine the location of the CG resource. Optionally, the first information further includes reference location information, where the reference location information includes at least one of the following: a reference frame number, a time domain offset, and a start symbol. Optionally, the reference location information is CG resource configuration information sent by the network device to the terminal device when the BWP is activated, and the terminal device stores the CG resource configuration information after receiving the CG resource configuration information.

In an example, the above step 410 includes: determining the location of the CG resource according to the first information corresponding to the BWP before the BWP is reactivated; or determining the location of the CG resource according to the first information corresponding to the BWP after the BWP is reactivated.

That is, in the case of deactivation of the BWP, the terminal device may determine the location of the CG resource based on either the corresponding first information before the deactivation of the BWP, or the corresponding first information after the deactivation of the BWP, which is not limited by the embodiments of the present application. Optionally, the corresponding first information before the BWP reactivation is the first information generated before the BWP reactivation; or, it is the first information determined before the BWP reactivation, which is not limited in the embodiments of the present application. Optionally, the corresponding first information after the BWP reactivation is the first information generated after the BWP reactivation; or, it is the first information determined after the BWP reactivation, which is not limited in the embodiments of the present application.

For example, for the case where the terminal device stops determining or calculating the location of the CG resource corresponding to the BWP when the BWP is deactivated, in the case that the BWP is reactivated at a certain moment after the deactivation of the BWP, the UE calculates the location according to the CG configuration before deactivation of the BWP, or the UE calculates the CG location after BWP reactivation according to the information when configuring the CG; or, for example, for the case where the terminal device stops determining or calculating the location of the CG resource corresponding to the BWP when the BWP is deactivated, when the BWP is reactivated at a certain moment after the deactivation of the BWP, the UE calculates the CG location according to the information after the BWP reactivation, or the UE calculates the location according to the CG configuration after the BWP reactivation.

The specific content of the frame number information is not limited in the embodiment of the present application. Optionally, the frame number information includes a first system frame number cycle and/or a first hyper frame number. According to either the first system frame number cycle or the first hyper frame number, the terminal device can calculate the location of the CG resource. The embodiment of the present application does not limit the timing for determining the frame number information. Optionally, the frame number information is determined before reactivating the BWP. Optionally, the terminal device stores the frame number information when determining the frame number information; or, determines the frame number information after reactivating the BWP. For an introduction and description of the way of determining the frame number information, the following method embodiments may be referred to, and details are not repeated here.

To sum up, in the technical solutions provided by the embodiments of the present application, in the case that BWP is reactivated, the location of the CG resource is determined according to the first information, where the first information includes frame number information for determining the location of the CG resource, thus, a method for determining or calculating the location of a CG resource corresponding to a BWP after the BWP is reactivated is provided.

In addition, in the embodiment of the present application, the frame number information is used by the terminal device to provide a definite system frame number cycle and/or hyper frame number when determining or calculating the location of the CG resource, so that the terminal device can determine the information of the reference frame number, and ensure that the locations of the CG resource determined or calculated by the terminal device and the network device using the same method for determining the resource location are the same, thereby ensuring the quality of service such as TSC services and improving the reliability of communication.

In the embodiment of the present application, the terminal device may determine the frame number information before reactivating the BWP, or may determine the frame number information after reactivating the BWP. The following describes the process of determining the frame number information by the terminal device.

In an example, as shown in FIG. 5, before the above step 410, the method further includes the following steps.

In step 402, before the BWP is reactivated, the frame number information is stored.

The terminal device may use the frame number information stored before the BWP is reactivated, and when the BWP is reactivated, the terminal device calculates the location of the CG resource corresponding to the BWP. The embodiment of the present application does not limit the timing for storing the frame number information. Optionally, the terminal device stores the frame number information before deactivation, or stores the frame number information after deactivation. The embodiment of the present application does not limit the content of the frame number information. Optionally, the frame number information includes a system frame number cycle and/or a hyper frame number. Optionally, the contents of the frame number information stored by the terminal device at different timings may be the same or different. The following describes the contents of the frame number information with several examples.

For example, the frame number information includes a first system frame number cycle, and the first system frame number cycle is a system frame number cycle where the CG resource configuration information is located when the CG resource configuration information is received; and/or, the frame number information includes a first hyper frame number, and the first hyper frame number is a hyper frame number where the CG resource configuration information is located when the CG resource configuration information is received.

When activating the BWP, the network device may send the CG resource configuration information to the terminal device, and the terminal device may store the frame number information when receiving the CG resource configuration information.

For example, when the frame number information includes the first system frame number cycle and/or the first hyper frame number, the terminal device determines the system frame number cycle where the CG resource configuration information is received as the first system frame number cycle, and determines the hyper frame number where the CG resource configuration information is received as the first hyper frame number.

It should be understood that the embodiments of the present application only take the frame number information being stored when the CG resource configuration information is received as an example for illustration. After understanding the technical solutions of the present application, those skilled in the art will easily think that the frame number information when decoding the CG resource configuration information, when acquiring the CG resource configuration information, and when configuring the CG resource configuration information, etc., is the stored frame number information, which should all fall within the protection scope of the present application.

Figure 6:
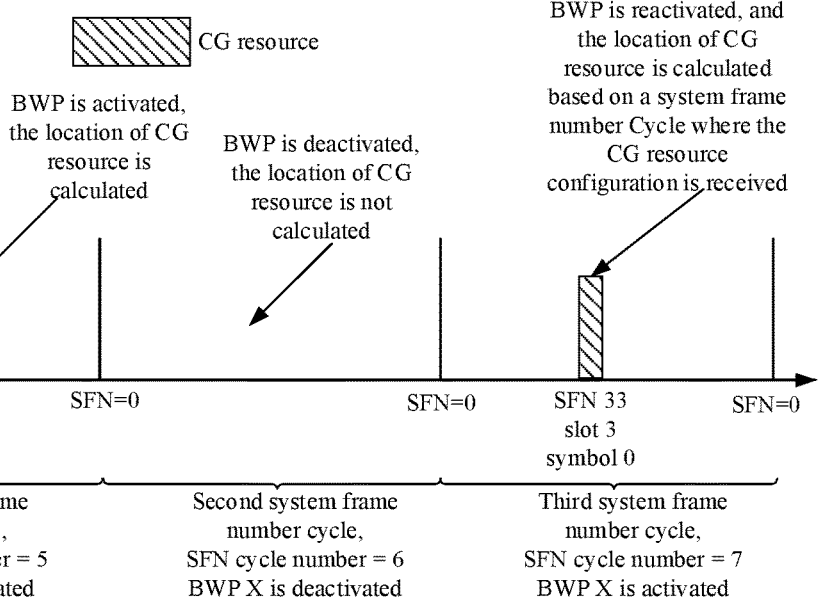
FIG. 6 is a schematic diagram of a process for determining a resource location provided by an embodiment of the present application.

Referring to FIG. 6, which shows a schematic diagram of a process of determining a resource location provided by an embodiment of the present application. It is assumed that in the first system frame number cycle, the terminal device receives CG resource configuration information corresponding to BWP X, where X is an integer greater than or equal to 1. When the terminal device receives the CG resource configuration information, the terminal device stores the CG resource configuration information, and stores the system frame number cycle where the CG resource configuration information is located when the CG resource configuration information is received. According to the CG resource configuration information, the terminal device calculates that the starting location of the CG resource is located in a radio frame with SFN being equal to 23 in the first system frame number cycle. Assuming that the BWP X is deactivated in the second system frame number cycle, the terminal device stops determining or calculating the location of the CG resource. The BWP X is reactivated in the third system frame number cycle, and the terminal device continues to determine or calculate the location of the CG resource. At this time, the terminal device continues to determine or calculate the location of the CG resource, which is calculated based on the location information when the CG configuration information is acquired.

For example, the terminal device performs the calculation based on the system frame number cycle where the CG resource configuration information is located when the CG resource configuration information is received. Optionally, the UE stores the frame number information in the first system frame number cycle. Among the locations of the CG resources calculated by the terminal device during reactivation, in the third system frame number cycle, the starting location of the CG resource is located in a radio frame with SFN=33. Optionally, the system frame number cycle corresponds to a cycle number. As shown in FIG. 6, the cycle number of the first system frame number cycle is 5, the cycle number of the second system frame number cycle is 6, and the cycle number of the third system frame number cycle is 7.

For example, the frame number information includes a first system frame number cycle, and the first system frame number cycle is a system frame number cycle where the starting location of the CG resource is located; and/or, the frame number information includes a first hyper frame number, and the first hyper frame number is a hyper frame number where the starting location of the CG resource is located.

When activating the BWP, after receiving the CG resource configuration information, the terminal device may calculate the starting location of the CG resource according to the CG resource configuration information, and store the frame number information corresponding to the starting location of the CG resource.

For example, when the frame number information includes the first system frame number cycle and/or the first hyper frame number, the terminal device determines the system frame number cycle where the starting location of the CG resource is located as the first system frame number cycle, and determines the hyper frame number where the starting location of the CG resource is located as the first hyper frame number.

For example, the frame number information includes location information of the first CG resource; the first CG resource is any CG resource in a system frame number cycle where the BWP is located when the BWP is deactivated; and/or the first CG resource is any CG resource in the hyper frame corresponding to a hyper frame number where the BWP is located when the BWP is deactivated.

When the BWP is deactivated, the terminal device stops using the CG resource corresponding to the BWP. When deactivating the BWP, the terminal device may store the location information of any CG resource (the first CG resource) in the system frame number cycle where the BWP is located when the BWP is deactivated or in the hyper frame corresponding to the hyper frame number where the BWP is located when the BWP is deactivated, and determine this location information as the frame number information. The embodiment of the present application does not limit the specific implementation of the first CG resource. Optionally, the first CG resource is the first one CG resource in the system frame number cycle or in the hyper frame corresponding to the hyper frame number where the BWP is located when the BWP is deactivated; or, the first CG resource is the last CG resource in the system frame number cycle where the BWP is located when the BWP is deactivated or in the hyper frame corresponding to the hyper frame number where the BWP is located when the BWP is deactivated.

The embodiment of the present application does not limit the content of the location information of the first CG resource. Optionally, the location information of the first CG resource includes at least one of the following: a first identifier, a system frame number cycle where the location of the first CG resource is located, and a hyper frame number where the location of the first CG resource is located. The first identifier is used to indicate an identifier of the number of CG resources in case that the location of the first CG resource crosses the system frame number cycle. Optionally, the first identifier is represented in the form of a numerical value, such as N, and the value of the numerical value may be infinite.

In summary, the technical solutions provided by the embodiments of the present application determine the frame number information before the BWP is reactivated, so that the terminal device uses the determined frame number information to determine or calculate the location of the CG resource when the BWP is reactivated, thus, a basis is provided for the determination or calculation of the location of the CG resource.

In addition, in the embodiment of the present application, the frame number information may be determined when the terminal device receives the CG resource configuration information, may also be determined when the terminal device calculates the starting location of the CG resource, and may also be determined when the BWP is deactivated. Thus, various timings for determining the frame number information are provided, and various options are provided for the terminal device to determine the frame number information.

In addition, in the embodiment of the present application, the contents of the frame number information determined by the terminal device at different timings may be different, thereby enriching the content of the frame number information.

In another example, as shown in FIG. 5, before the above step 410, the method further includes the following steps.

In step 404, after the BWP is reactivated, frame number information is determined.

After the BWP is reactivated, the terminal device may use the frame number information determined after the reactivation to calculate the location of the CG resource corresponding to the BWP. The embodiment of the present application does not limit the content of the frame number information. Optionally, the frame number information includes a system frame number cycle and/or a hyper frame number. The embodiment of the present application does not limit the specific meaning of after the BWP is reactivated. Optionally, after the BWP is reactivated includes: reactivation of the BWP ends, or reactivation of the BWP is successful. The embodiment of the present application does not limit the subject that triggers the BWP to reactivate. Optionally, the reactivation of the BWP is triggered by the terminal device, or triggered by the network device, or triggered by a timer. Optionally, for different triggering modes of reactivation of the BWP, the contents of the frame number information determined by the terminal device may be the same or different. The following describes the contents of the frame number information in different reactivation modes of the BWP with several examples.

For example, the reactivation of BWP is triggered by the terminal device; the frame number information includes a first system frame number cycle, and the first system frame number cycle is a system frame number cycle where the BWP handover ends or the BWP handover is successful; and/or, the frame number information includes a first hyper frame number, and the first hyper frame number is a hyper frame number where the BWP handover ends or the BWP handover is successful.

In the case that the terminal device triggers reactivation of BWP, the terminal device may determine the frame number information when the BWP handover ends or the BWP handover is successful.

For example, when the frame number information includes a first system frame number cycle and/or a first hyper frame number, the terminal device determines the system frame number cycle where the BWP handover ends or the BWP handover is successful as the first system frame number cycle, and determines the hyper frame number where the BWP handover ends or the BWP handover is successful as the first hyper frame number. The embodiment of the present application does not limit the manner in which the terminal device triggers the reactivation of BWP. Optionally, the terminal device may trigger the reactivation of BWP through a random access procedure. In the case where the terminal device triggers the reactivation of BWP through the random access procedure, the end of the BWP handover includes the end of the random access procedure, and the successful BWP handover includes the success of the random access procedure. Additionally, in this example, the CG resource is unavailable, or is not calculated, until the BWP handover ends.

For example, the reactivation of BWP is triggered by the network device; the frame number information includes a first system frame number cycle, and the first system frame number cycle is a system frame number cycle where handover indication information is located when the handover indication information is received; and/or, the frame number information includes a first hyper frame number, and the first hyper frame number is a hyper frame number where the handover indication information is located when the handover indication information is received; where the handover indication information is used to instruct the terminal device to reactivate the BWP.

When the network device triggers reactivation of BWP, the network device may send handover indication information to the terminal device, where the handover indication information is used to instruct the terminal device to reactivate the BWP. The embodiment of the present application does not limit the bearing manner of the handover indication information, and optionally, the handover indication information is RRC information or DCI. The terminal device may determine the frame number information when receiving the handover indication information.

For example, in the case that the frame number information includes a first system frame number cycle and/or a first hyper frame number, the terminal device determines a system frame number cycle where the handover indication information is located when the handover indication information is received as the first system frame number cycle, and determines the hyper frame number where the handover indication information is located when the handover indication information is received as the first hyper frame number.

It should be understood that determining the frame number information when the terminal device receives the handover indication information is taken as an example in the embodiments of the present application. After learning the technical solutions of the present application, the person skilled in the art could easily think of determining the frame number information when the handover indication information is decoded, when the handover indication information is obtained, when the handover indication information is configured, etc., which all should fall within the protection scope of the present application. Additionally, in this example, the CG resource is unavailable, or is not calculated, until the BWP handover ends.

According to the description of the above embodiments, when the terminal device receives the configuration information from the network device at a boundary of the system frame number cycle, the system frame number cycles selected by the network device and the terminal device may be inconsistent, which results in that the locations of the CG resources determined by the network device and the terminal device are not the same. Optionally, in the embodiment of the present application, when the network device sends handover indication information for indicating reactivation of BWP to the terminal device, in order to avoid the locations of the CG resource determined by the network device and the terminal device from being different, the terminal device does not expect to receive the handover indication information from the network device within a first range, where the first range includes a range corresponding to the boundary of the system frame number cycle. The embodiment of the present application does not limit the specific value of the first range. Optionally, a starting position of the first range is the boundary of the system frame number cycle minus a first value, and an end position of the first range is the boundary of the system frame number cycle plus a second value; where the first value is the same as the second value, or the first value and the second value are different. Optionally, the first value and the second value are associated with the capability of the terminal device. For a terminal device with high processing capability, the values of the first value and the second value are smaller than those of a terminal device with low processing capability.

It should be understood that, in the embodiment of the present application, the terminal device does not expect to receive the handover indication information from the network device within the first range, including: the terminal device does not expect that the network device sends the handover indication information to the terminal device within the first range, or, the network device sends handover indication information to the terminal device, but the terminal device does not expect to receive the handover indication information within the first range.

For example, the reactivation of BWP is triggered by a first timer, and the first timer is used to indicate a time period for BWP deactivation; the frame number information includes a first system frame number cycle, and the first system frame number cycle is a system frame number cycle where the first timer times out; and/or, the frame number information includes a first hyper frame number, and the first hyper frame number is a hyper frame number where the first timer expires.

In the case where the first timer triggers reactivation of BWP, the terminal device may determine the frame number information when the first timer expires, where the first timer is used to indicate the time period for BWP deactivation. Optionally, the first timer is implemented as bwp-InactivityTimer (BWP inactivity timer).

For example, when the frame number information includes a first system frame number cycle and/or a first hyper frame number, the terminal device determines the system frame number cycle where the first timer expires as the first system frame number cycle, and determines the hyper frame number where the first timer expires as the first hyper frame number. Additionally, in this example, the CG resource is unavailable, or is not calculated, until the BWP handover ends.

According to the description of the above embodiments, when the terminal device receives the configuration information from the network device at the boundary of the system frame number cycle, the locations of the CG resources determined by the network device and the terminal device may be different. Optionally, in the embodiment of the present application, when the first timer triggers reactivation of BWP, in order to avoid the locations of the CG resource determined by the network device and the terminal device from being different, the terminal device does not expect that the location where the first timer expires to be located in the first range, and the first range includes a range corresponding to the boundary of the system frame number cycle.

For the introduction and description of the first range, the above-mentioned embodiments may be referred to, and details are not repeated here. However, because the terminal device may not be able to predict the time when the BWP is deactivated, and thus the terminal device cannot predict the location where the first timer expires, in order to ensure that the locations of the CG resources determined by the terminal device and the network device are the same when the location where the first timer expires is within the first range, in the embodiment of the present application, the first system frame number cycle is a next system frame number cycle corresponding to the boundary of the system frame number cycle. That is, the terminal device determines the next system frame number cycle corresponding to the boundary of the system frame number cycle as the first system frame number cycle.

Figure 7:
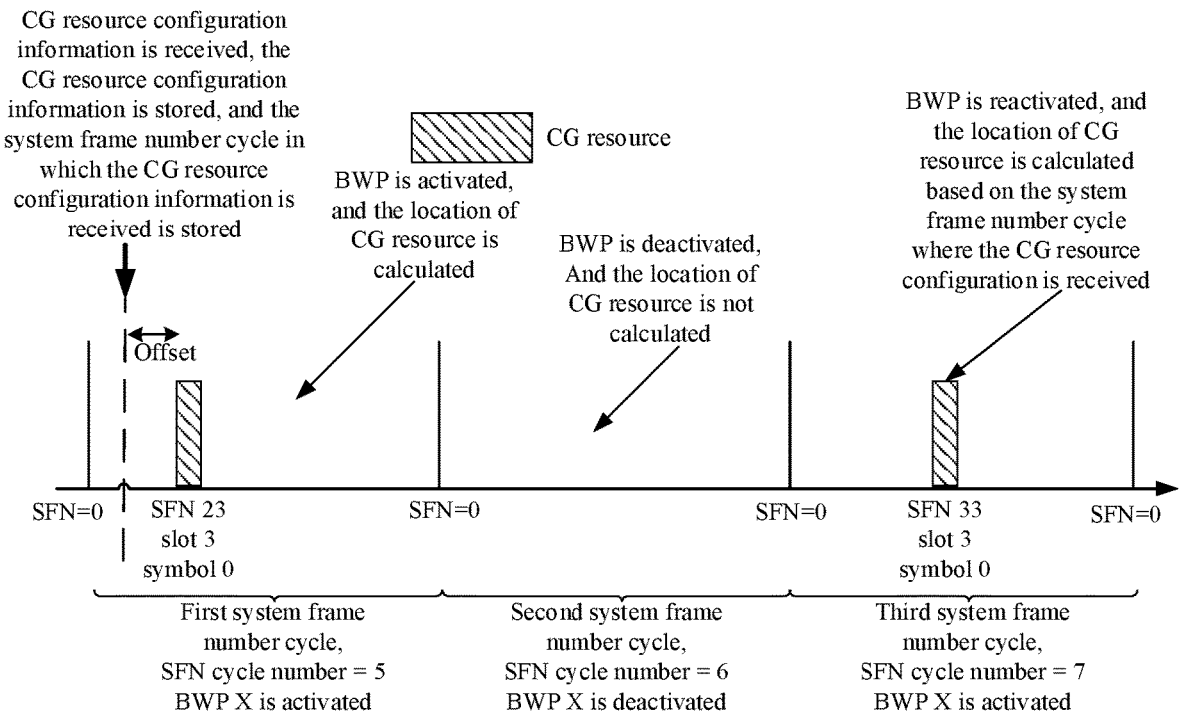
FIG. 7 is a schematic diagram of a process for determining a resource location provided by another embodiment of the present application.

Referring to FIG. 7, which shows a schematic diagram of a process of determining a resource location provided by an embodiment of the present application, it is assumed that in the first system frame number cycle, the terminal device receives CG resource configuration information corresponding to BWP X, where X is an integer greater than or equal to 1. According to the CG resource configuration information, the terminal device calculates that the starting location of the CG resource is located in a radio frame with SFN being equal to 23 in the first system frame number cycle. Assuming that the BWP X is deactivated in the second system frame number cycle, the terminal device stops determining or calculating the location of the CG resource. The BWP X is reactivated in the third system frame number cycle, and the terminal device continues to determine or calculate the location of the CG resource. At this time, the terminal device continues to determine or calculate the location of the CG resource based on the frame number information determined after its BWP is reactivated. In the locations of the CG resource calculated by the terminal device during reactivation, an offset between the starting location of the CG resource and SFN=0 in the third system frame number cycle is the same as an offset between the starting location of the CG resource and SFN=0 in the first system frame number cycle. That is, in the third system frame number cycle, the starting location of the CG resource is also located in the radio frame with SFN=23. Optionally, the system frame number cycle corresponds to a cycle number. As shown in FIG. 7, the cycle number of the first system frame number cycle is 5, the cycle number of the second system frame number cycle is 6, and the cycle number of the third system frame number cycle is 7.

To sum up, the technical solutions provided by the embodiments of the present application determine the frame number information after BWP is reactivated, and determine or calculate the location of the CG resource according to the determined frame number information, so that a basis for determining or calculating the location of the CG resource is provided.

In addition, in the embodiment of the present application, different ways of determining the frame number information are provided according to different BWP reactivation methods, so that the determination method of frame number information is matched with the BWP reactivation method, so as to ensure the accuracy of the frame number information.

It should be noted that, in the embodiment of the present application, the terminal device determining or calculating the location of the CG resource is taken as an example for illustration. As to the method for the network device to determine or calculate the location of the CG resource, the above embodiments may be referred to.

In addition, in order to ensure that the locations of the CG resource determined or calculated by the network device and the terminal device are the same, in the embodiment of the present application, the network device and the terminal device use the same method to determine or calculate the location of the CG resource, which shall belong to the protection scope of the present application.

The following are apparatus embodiments of the present application, which may be used to execute the method embodiments of the present application. For details not disclosed in the apparatus embodiments of the present application, the method embodiments of the present application may be referred to.

Figure 8:
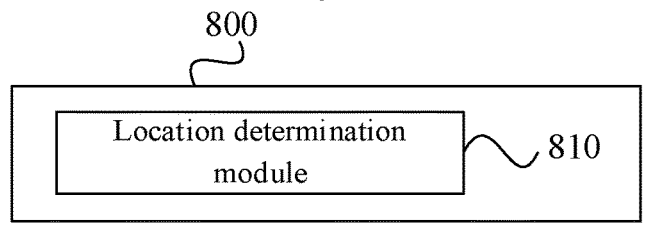
FIG. 8 is a flowchart of an apparatus for determining a resource location provided by an embodiment of the present application.

Referring to FIG. 8, which shows a block diagram of an apparatus for determining a resource location provided by an embodiment of the present application, the apparatus has the function of implementing the above method examples, and the function may be implemented by hardware or by executing corresponding software in hardware. The apparatus may be the above-mentioned terminal device, or may be provided in the terminal device. As shown in FIG. 8, the apparatus 800 may include: a location determination module 810.

The location determination module 810 is configured to determine a location of a CG resource according to first information in the case that BWP is reactivated, where the first information includes frame number information used for determining the location of the CG resource.

In an example, the location determination module is configured to: determine the location of the CG resource according to the first information corresponding to the BWP before the BWP is reactivated; or, determine the location of the CG resource according to the first information corresponding to the BWP after the BWP is reactivated.

Figure 9:
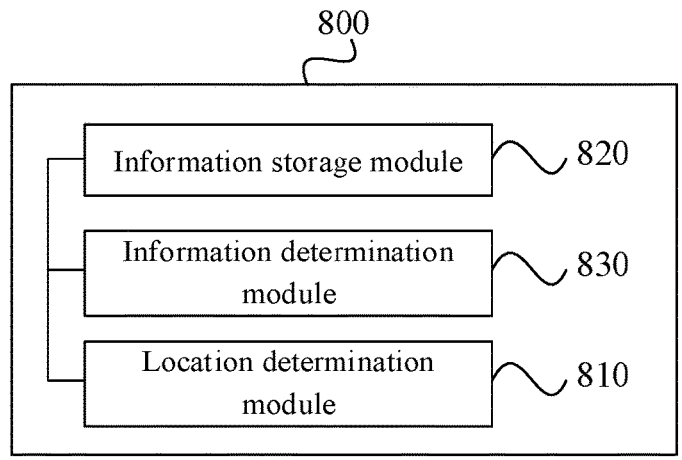
FIG. 9 is a flowchart of an apparatus for determining a resource location provided by another embodiment of the present application.

In an example, as shown in FIG. 9, the apparatus 800 further includes: an information storage module 820, configured to store frame number information before the BWP is reactivated.

In an example, the frame number information includes a first system frame number cycle, and the first system frame number cycle is a system frame number cycle where CG resource configuration information is located when CG resource configuration information is received; and/or the frame number information includes a first hyper frame number, and the first hyper frame number is a hyper frame number where the CG resource configuration information is located when CG resource configuration information is received.

In an example, the frame number information includes a first system frame number cycle, and the first system frame number cycle is a system frame number cycle where the starting location of the CG resource is located; and/or, the frame number information includes a first hyper frame number, and the first hyper frame number is a hyper frame number where the starting location of the CG resource is located.

In an example, the frame number information includes location information of a first CG resource; the first CG resource is any CG resource in a system frame number cycle where the BWP is located when the BWP is deactivated; and/or, the first CG resource is any CG resource in a hyper frame corresponding to a hyper frame number where the BWP is located when the BWP is deactivated.

In an example, the location information of the first CG resource includes at least one of the following items: a first identifier, a system frame number cycle where a location of the first CG resource is located, and a hyper frame number where the location of the first CG resource is located; where the first identifier is used to indicate an identifier of the number of CG resources in the case where the location of the first CG resource is across the system frame number cycle.

In an example, the apparatus 800 further includes: an information determination module 830, configured to determine frame number information after the BWP is reactivated.

In an example, the reactivation of BWP is triggered by the terminal device; the frame number information includes a first system frame number cycle, and the first system frame number cycle is a system frame number cycle in which the BWP handover ends or the BWP handover succeeds; and/or, the frame number information includes a first hyper frame number, and the first hyper frame number is a hyper frame number where the BWP handover ends or the BWP handover succeeds.

In an example, when the terminal device triggers the reactivation of BWP through a random access procedure, the end of the BWP handover includes the end of the random access procedure, and the success of the BWP handover includes the success of the random access procedure.

In an example, the reactivation of BWP is triggered by the network device; the frame number information includes a first system frame number cycle, and the first system frame number cycle is a system frame number cycle where handover indication information is located when the handover indication information is received; and/or, the frame number information includes a first hyper frame number, and the first hyper frame number is a hyper frame number where the handover indication information is located when the handover indication information is received; where the handover indication information is used to indicate the terminal device to reactivate the BWP.

In an example, the terminal device does not expect to receive the handover indication information from the network device within a first range, where the first range includes a range corresponding to a boundary of the system frame number cycle.

In an example, the handover indication information is RRC information or DCI.

In an example, the reactivation of BWP is triggered by a first timer, and the first timer is used to indicate a time period for the BWP deactivation; the frame number information includes a first system frame number cycle, and the first system frame number cycle is a system frame number cycle where the first timer expires; and/or, the frame number information includes a first hyper frame number, and the first hyper frame number is a hyper frame number where the first timer expires.

In an example, the terminal device does not expect the location where the first timer expires to be within a first range, where the first range includes a range corresponding to a boundary of the system frame number cycle.

In an example, the frame number information includes a first system frame number cycle, and in the case where the location where the first timer expires is within the first range, the first system frame number cycle is a next system frame number cycle corresponding to the boundary of the system frame number cycle, and the first range includes a range corresponding to the boundary of the system frame number cycle.

In an example, the starting position of the first range is the boundary of the system frame number cycle minus a first value, and the end position of the first range is the boundary of the system frame number cycle plus a second value; where the first value is the same as the second value, or the first value is different from the second value.

In an example, after the reactivation of BWP includes: the reactivation of BWP ends, or the reactivation of BWP is successful.

In an example, the first information further includes reference location information, and the reference location information includes at least one of the following: a reference frame number, a time domain offset, and a start symbol.

In an example, the location determination module is further configured to stop determining the location of the CG resource in the case of deactivation of the BWP.

To sum up, in the technical solutions provided by the embodiments of the present application, in the case that BWP is reactivated, the location of the CG resource is determined according to the first information, where the first information includes frame number information for determining the location of the CG resource. Thus, a method for determining or calculating the location of a CG resource corresponding to a BWP after reactivation of the BWP is provided.

In addition, in the embodiment of the present application, the frame number information is used by the terminal device to provide a definite system frame number cycle and/or hyper frame number when determining or calculating the location of the CG resource, so as to ensure that the locations of the CG resource determined or calculated by the terminal device and the network device using the same method for determining a resource location are the same, thereby ensuring the quality of service such as TSC services and improving the reliability of communication.

It should be noted that, when the apparatus provided in the above embodiment realizes its functions, the division of the above functional modules is only used as an example for illustration. In practical applications, the above functions may be allocated to different functional modules according to actual needs. That is, the content structure of the device is divided into different functional modules to complete all or part of the functions described above.

Regarding the apparatus in the above-mentioned embodiments, the specific manner in which each module performs operations has been described in detail in the embodiments of the method, and will not be described in detail here.

Figure 10:
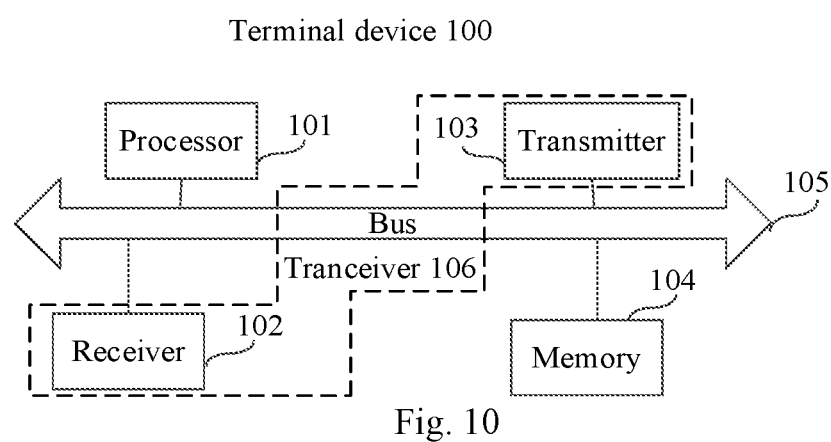
FIG. 10 is a structural block diagram of a terminal device provided by an embodiment of the present application.

Referring to FIG. 10, which shows a schematic structural diagram of a terminal device 100 provided by an embodiment of the present application, for example, the terminal device may be used to execute the above resource selection method. Specifically, the terminal device 100 may include: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as one transceiver 106, which may be a communication chip.

The memory 104 is connected to the processor 101 through the bus 105.

The memory 104 may be used to store a computer program, and the processor 101 is used to execute the computer program, so as to implement various steps performed by the terminal device in the above method embodiments.

In addition, the memory 104 may be implemented by any type of volatile or non-volatile storage device or a combination thereof, and the volatile or non-volatile storage device includes, but is not limited to: a Random-Access Memory (RAM) and a Read-Only Memory (ROM), an Erasable Programmable Read-Only Memory (EPROM), an Electrically Erasable Programmable Read-Only Memory (EEPROM), a flash memory or other solid state storage technology, a Compact Disc Read-Only Memory (CD-ROM), a Digital Video Disc (DVD) or other optical storage, cassettes, magnetic tapes, magnetic disk storage or other magnetic storage devices.

The processor 101 is configured to, in the case that BWP is reactivated, determine the location of the CG resource according to first information, where the first information includes frame number information used to determine the location of the CG resource.

In an example, the processor 101 is configured to determine the location of the CG resource according to the first information corresponding to the BWP before the BWP is reactivated; or, determine the location of the CG resource according to the first information corresponding to the BWP after the BWP is reactivated.

In an example, the processor 101 is further configured to: store the frame number information before the BWP is reactivated.

In an example, the frame number information includes a first system frame number cycle, and the first system frame number cycle is a system frame number cycle where the CG resource configuration information is located when the CG resource configuration information is received; and/or the frame number information includes a first hyper frame number, and the first hyper frame number is a hyper frame number where the CG resource configuration information is located when the CG resource configuration information is received.

In an example, the frame number information includes a first system frame number cycle, and the first system frame number cycle is a system frame number cycle where the starting location of the CG resource is located; and/or, the frame number information includes a first hyper frame number, and the first hyper frame number is a hyper frame number where the starting location of the CG resource is located.

In an example, the frame number information includes location information of a first CG resource; the first CG resource is any CG resource in a system frame number cycle where the BWP is located when the BWP is deactivated; and/or, the first CG resource is any CG resource in a hyper frame corresponding to the a frame number where the BWP is located when the BWP is deactivated.

In an example, the location information of the first CG resource includes at least one of the following items: a first identifier, a system frame number cycle where the location of the first CG resource is located, and a hyper frame number where the location of the first CG resource is located; where the first identifier is used to indicate an identifier of the number of CG resources in the case where the location of the first CG resource crosses the system frame number cycle.

In an example, the processor 101 is further configured to: determine the frame number information after the BWP is reactivated.

In an example, the reactivation of BWP is triggered by the terminal device; the frame number information includes a first system frame number cycle, and the first system frame number cycle is a system frame number cycle in which the BWP handover ends or the BWP handover succeeds; and/or, the frame number information includes a first hyper frame number, and the first hyper frame number is a hyper frame number where the BWP handover ends or the BWP handover succeeds.

In an example, when the terminal device triggers the reactivation of BWP through a random access procedure, the end of the BWP handover includes the end of the random access procedure, and the success of the BWP handover includes the success of the random access procedure.

In an example, the reactivation of BWP is triggered by a network device; the frame number information includes a first system frame number cycle, and the first system frame number cycle is a system frame number cycle where the handover indication information is located when the handover indication information is received; and/or, the frame number information includes a first hyper frame number, and the first hyper frame number is a hyper frame number where the handover indication information is located when the handover indication information is received; where the handover indication information is used to indicate the terminal device to reactivate the BWP.

In an example, the terminal device does not expect to receive the handover indication information from the network device within a first range, where the first range includes a range corresponding to a boundary of the system frame number cycle.

In an example, the handover indication information is RRC information or DCI.

In an example, the reactivation of BWP is triggered by a first timer, and the first timer is used to indicate a time period for the BWP deactivation; the frame number information includes a first system frame number cycle, and the first system frame number cycle is a system frame number cycle where the first timer expires; and/or, the frame number information includes a first hyper frame number, and the first hyper frame number is a hyper frame number where the first timer expires.

In an example, the terminal device does not expect the location where the first timer expires to be within a first range, where the first range includes a range corresponding to a boundary of the system frame number cycle.

In an example, the frame number information includes a first system frame number cycle, and in the case where the position where the first timer expires is within a first range, the first system frame number cycle is a next system frame number cycle system corresponding to the boundary of the system frame number cycle, and the first range includes a range corresponding to the boundary of the system frame number cycle.

In an example, the starting position of the first range is the boundary of the system frame number cycle minus a first value, and the end position of the first range is the boundary of the system frame number cycle plus a second value; where the first value is the same as the second value, or the first value is different from the second value.

In an example, after the BWP is reactivated includes: the reactivation of BWP ends, or the reactivation of BWP is successful.

In an example, the processor 101 is further configured to: stop determining the location of the CG resource when the BWP is deactivated.

In an example, the first information further includes reference location information, and the reference location information includes at least one of the following: a reference frame number, a time domain offset, and a start symbol.

An embodiment of the present application further provides a computer-readable storage medium, where a computer program is stored in the storage medium, and the computer program is configured to be executed by a processor of a terminal device, so as to implement the foregoing method for determining a resource location.

An embodiment of the present application further provides a chip, where the chip includes a programmable logic circuit and/or program instructions, and when the chip runs on a terminal device, it is used to implement the above method for determining a resource location.

The present application also provides a computer program product, and when the computer program product runs on a terminal device, a computer is enabled to execute the above method for determining a resource location.

Those skilled in the art should realize that, in one or more of the above examples, the functions described in the embodiments of the present application may be implemented by hardware, software, firmware, or any combination thereof. When implemented in software, the functions may be stored in the computer-readable medium or transmitted as one or more instructions or codes on the computer-readable medium. The computer-readable medium includes both a computer storage medium and a communication medium, and the communication medium includes any medium that facilitates transfer of a computer program from one place to another. The storage medium may be any available medium that can be accessed by a general purpose or special purpose computer.

The above descriptions are only exemplary embodiments of the present application, and are not intended to limit the present application. Any modifications, equivalent replacements, improvements, etc. made within the spirit and principles of the present application shall be included in the protection scope of the present application.

What is claimed is:

1. A method for determining a resource location, applied to a terminal device, the method comprising:
   in a case that bandwidth part (BWP) is reactivated, determining a location of a configured grant (CG) resource according to first information, wherein the first information comprises frame number information for determining the location of the CG resource,
   wherein the determining the location of the CG resource according to the first information comprises:
   determining the location of the CG resource according to first information corresponding to the BWP before the BWP is reactivated,
   wherein before determining the location of the CG resource according to the first information corresponding to the BWP before the BWP is reactivated, the method further comprises:
   before the BWP is reactivated, storing the frame number information.

2. The method according to claim 1, wherein
the frame number information comprises a first system frame number cycle, and the first system frame number cycle is a system frame number cycle where CG resource configuration information is located when the CG resource configuration information is received; and/or,
the frame number information comprises a first hyper frame number, and the first hyper frame number is a hyper frame number where the CG resource configuration information is located when the CG resource configuration information is received.

3. The method according to claim 1, wherein
the frame number information comprises a first system frame number cycle, and the first system frame number cycle is a system frame number cycle where a starting location of the CG resource is located; and/or,
the frame number information comprises a first hyper frame number, and the first hyper frame number is a hyper frame number where the starting location of the CG resource is located.

4. The method according to claim 1, wherein the frame number information comprises location information of a first CG resource;
the first CG resource is any CG resource in the system frame number cycle where the BWP is located when the BWP is deactivated; and/or,
the first CG resource is any CG resource in a hyper frame corresponding to the hyper frame number where the BWP is located when the BWP is deactivated.

5. The method according to claim 1, wherein before determining the location of the CG resource according to the first information corresponding to the BWP after the BWP is reactivated, the method further comprises:
after the BWP is reactivated, determining the frame number information.

6. The method according to claim 5, wherein reactivation of the BWP is triggered by the terminal device;
the frame number information comprises a first system frame number cycle, and the first system frame number cycle is a system frame number cycle where a BWP handover ends or the BWP handover is successful; and/or,
the frame number information comprises a first hyper frame number, and the first hyper frame number is a hyper frame number where the BWP handover ends or the BWP handover is successful.

7. The method according to claim 5, wherein reactivation of the BWP is triggered by a network device;
the frame number information comprises a first system frame number cycle, and the first system frame number cycle is a system frame number cycle where a handover indication information is located when the handover indication information is received; and/or,
the frame number information comprises a first hyper frame number, and the first hyper frame number is a hyper frame number where the handover indication information is located when the handover indication information is received;
wherein the handover indication information is used to instruct the terminal device to reactivate the BWP.

8. The method according to claim 5, wherein reactivation of the BWP is triggered by a first timer, and the first timer is used to indicate a time period during which the BWP is deactivated;
the frame number information comprises a first system frame number cycle, and the first system frame number cycle is a system frame number cycle where a position where the first timer expires is located; and/or,
the frame number information comprises a first hyper frame number, and the first hyper frame number is a hyper frame number where the position where the first timer expires is located.

9. The method according to claim 8, wherein
the frame number information comprises a first system frame number cycle, and in a case where the position where the first timer expires is located within a first range, the first system frame number cycle is a next system frame number cycle corresponding to a boundary of the system frame number cycle, and the first range comprises a range corresponding to the boundary of the system frame number cycle.

10. A terminal device, wherein the terminal device comprises: a processor, and a transceiver connected to the processor; wherein
the processor is configured to, in a case that bandwidth part (BWP) is reactivated, determine a location of a configured grant (CG) resource according to first information, wherein the first information comprises frame number information for determining the location of the CG resource,
wherein the processor is further configured to:
determine the location of the CG resource according to first information corresponding to the BWP before the BWP is reactivated,
wherein the processor is further configured to:
before the BWP is reactivated, store the frame number information.

11. A non-transitory computer-readable storage medium, wherein a computer program is stored in the storage medium, and the computer program is used to be executed by a processor of a terminal device, so as to:
in a case that bandwidth part (BWP) is reactivated, determine a location of a configured grant (CG) resource according to first information, wherein the first information comprises frame number information for determining the location of the CG resource,
wherein the processor is further configured to:
determine the location of the CG resource according to first information corresponding to the BWP before the BWP is reactivated,
wherein the processor is further configured to:
before the BWP is reactivated, store the frame number information.

* * * * *